(12) United States Patent
Peterson et al.

(10) Patent No.: US 10,991,139 B2
(45) Date of Patent: Apr. 27, 2021

(54) PRESENTATION OF GRAPHICAL OBJECT(S) ON DISPLAY TO AVOID OVERLAY ON ANOTHER ITEM

(71) Applicant: Lenovo (Singapore) Pte. Ltd., New Tech Park (SG)

(72) Inventors: Nathan J. Peterson, Oxford, NC (US); Russell Speight VanBlon, Raleigh, NC (US); John Carl Mese, Cary, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/117,360

(22) Filed: Aug. 30, 2018

(65) Prior Publication Data
US 2020/0074704 A1    Mar. 5, 2020

(51) Int. Cl.
*G06T 11/60* (2006.01)
*G06K 9/00* (2006.01)
*G06F 3/0481* (2013.01)

(52) U.S. Cl.
CPC .......... *G06T 11/60* (2013.01); *G06F 3/04817* (2013.01); *G06K 9/00221* (2013.01); *G06K 9/00362* (2013.01); *G06T 2200/24* (2013.01)

(58) Field of Classification Search
CPC ....... G06T 11/60; G06T 2200/24; G06T 7/70; G06T 7/60; G06T 11/008; G06T 1/0014; G06T 19/006; G06T 2207/30244; G06T 7/97; G06T 2215/16; G06T 2219/2004; G06T 7/194; G06T 7/11; G06T 7/90; G06T 7/13; G06T 2207/30261; G06T 7/20; G06F 3/04817; G06F 3/013; G06F 3/012; G06K 9/00221; G06K 9/00362; G06K 9/00288; G06K 9/00671
See application file for complete search history.

(56) References Cited

U.S. PATENT DOCUMENTS

| | | | |
|---|---|---|---|
| 7,576,725 | B2 | 8/2009 | Bathiche et al. |
| 8,098,171 | B1 | 1/2012 | Szczerba et al. |
| 8,164,543 | B2 | 4/2012 | Seder et al. |

(Continued)

OTHER PUBLICATIONS

Adam, Jos J., Bovend'Eerdt, Thamar J.H., Van Dooren, Fleur E.P., Fischer, Martin H., Pratt, Jay, "The closer the better: Hand proximity dynamically affects letter recognition accuracy", Attention, Perception, & Psychophysics, Oct. 2012, vol. 74, Issue 7, pp. 1533-1538. Retrieved from https://link.springer.com/article/10.3758/s13414-012-0339-3#citeas.

(Continued)

*Primary Examiner* — Xilin Guo
(74) *Attorney, Agent, or Firm* — John L. Rogitz

(57) ABSTRACT

In one aspect, a device includes at least one processor, a display accessible to the at least one processor, and storage accessible to the at least one processor. The storage includes instructions executable by the at least one processor to identify an item from an image presentable on the display. The instructions are also executable to arrange presentation on the display of one or more of the images and at least one graphical object so that the at least one graphical object is not overlaid on top of the item while the image is presented on the display concurrently with the at least one graphical object.

20 Claims, 8 Drawing Sheets

(56) References Cited

U.S. PATENT DOCUMENTS

| | | |
|---|---|---|
| 8,547,298 B2 | 10/2013 | Szczerba et al. |
| 8,922,588 B2 | 12/2014 | Makino et al. |
| 9,292,974 B2 | 3/2016 | Kaino et al. |
| 9,734,634 B1 | 8/2017 | Mott et al. |
| 10,133,342 B2 | 11/2018 | Mittal et al. |
| 10,347,002 B2 | 7/2019 | Dai et al. |
| 10,460,139 B1 | 10/2019 | Gabriel |
| 2008/0158096 A1 | 7/2008 | Breed |
| 2008/0235724 A1 | 9/2008 | Sassenscheidt et al. |
| 2009/0109240 A1 | 4/2009 | Englert et al. |
| 2009/0189974 A1 | 7/2009 | Deering |
| 2010/0079356 A1 | 4/2010 | Hoellwarth |
| 2010/0287511 A1 | 11/2010 | Meier et al. |
| 2011/0138416 A1 | 6/2011 | Kang et al. |
| 2011/0209099 A1 | 8/2011 | Hinckley et al. |
| 2012/0075463 A1 | 3/2012 | Chen et al. |
| 2013/0079627 A1 | 3/2013 | Lee |
| 2013/0267838 A1 | 10/2013 | Fronk et al. |
| 2014/0168056 A1* | 6/2014 | Swaminathan ......... G06F 3/147 345/156 |
| 2014/0184496 A1 | 7/2014 | Gribetz et al. |
| 2015/0138223 A1 | 5/2015 | Hornung et al. |
| 2015/0163345 A1* | 6/2015 | Cornaby ............. G06F 3/04847 345/633 |
| 2015/0302649 A1 | 10/2015 | Komatsu |
| 2015/0317518 A1 | 11/2015 | Fujimaki et al. |
| 2016/0041614 A1 | 2/2016 | Mok et al. |
| 2016/0049013 A1 | 2/2016 | Bautista |
| 2016/0163052 A1* | 6/2016 | Kim ...................... G06F 3/0483 715/766 |
| 2016/0189434 A1 | 6/2016 | Fong |
| 2016/0253844 A1 | 9/2016 | Petrovskaya et al. |
| 2016/0257199 A1 | 9/2016 | Bark et al. |
| 2016/0350601 A1 | 12/2016 | Grauer et al. |
| 2016/0357406 A1* | 12/2016 | Lee .......................... G06K 9/22 |
| 2016/0379412 A1 | 12/2016 | Butler et al. |
| 2017/0053444 A1 | 2/2017 | Huang et al. |
| 2017/0068380 A1 | 3/2017 | Hong et al. |
| 2017/0161950 A1 | 6/2017 | Seder et al. |
| 2017/0162177 A1 | 6/2017 | Lebeck et al. |
| 2017/0168566 A1 | 6/2017 | Osterhout et al. |
| 2017/0286061 A1* | 10/2017 | Tamai ................. G06F 3/04886 |
| 2017/0323485 A1 | 11/2017 | Samec et al. |
| 2017/0343811 A1 | 11/2017 | Mese et al. |
| 2017/0351544 A1* | 12/2017 | Park ................... G06F 3/03545 |
| 2018/0005406 A1 | 1/2018 | Dai et al. |
| 2018/0088185 A1 | 3/2018 | Woods et al. |
| 2018/0101989 A1 | 4/2018 | Frueh et al. |
| 2018/0158250 A1 | 6/2018 | Yamamoto et al. |
| 2018/0239144 A1 | 8/2018 | Woods et al. |
| 2018/0365855 A1 | 12/2018 | Laurent et al. |
| 2018/0365897 A1 | 12/2018 | Pahud et al. |
| 2019/0073040 A1* | 3/2019 | Luchner .............. G06F 3/04847 |
| 2019/0217202 A1 | 7/2019 | Komori et al. |
| 2019/0261957 A1 | 8/2019 | Zaslavsky et al. |
| 2019/0270022 A1 | 9/2019 | Magpuri et al. |
| 2019/0336864 A1 | 11/2019 | Magpuri et al. |

OTHER PUBLICATIONS

Festman, Y, Adam, JJ, Pratt, J, Fischer, MH. "Both hand position and movement direction modulate visual attention". Frontiers in Psychology. 2013; 4:657. Retrieved from https://www.ncbi.nlm.nih.gov/pmc/articles/PMC3787593/.

John Carl Mese, Arnolds. Weksler, Nathan J_ Peterson, Russell Speight Vanblon, "Systems and Methods for Presentation of Images from Camera Concurrently with Presentation of Virtual Reality Content", file history of related U.S. Appl. No. 15/164,045, filed May 25, 2016.

Qian et al., "Presentation of Augmented Reality Images at Display Locations that Do Not Obstruct User's View", file history of related U.S. Appl. No. 16/018,351, filed Jun. 26, 2018.

Rachel Metz, "How to Avoid Real Objects While in a Virtual World", Jun. 12, 2105, https://www.technologyreview.com/s/538336/how-to-avoid-real-objects-while-in-a-virtual-world/.

Reed, C. L., Betz, R., Garza, J., & Roberts, R. (2010). "Grab it! Biased attention for functional hand and tool space". Attention, Perception, & Psychophysics, 72, 236-245.

Reed, C. L., Grubb, J. D., & Steele, C. (2006). "Hands up: Attentional prioritization of space near the hand. Journal of Experimental Psychology". Human Perception and Performance, 32, 166-177, Abstract. Retrieved from https://www.ncbi.nlm.nih.gov/pubmed/16478334.

Robert James Kapinos, Timothy Winthrop Kingsbury, Russell Speight Vanblon, Scott Nentao Li, Jonathan Gaither Knox, Arnolds. Weksler, John Carl Mese, Nathan J_ Peterson, Systems and Methods to Alter Presentation of Virtual Rendition Based on Real World Object, file history of related U.S. Appl. No. 15/660,176, filed Jul. 26, 2017.

Rosenbaum, D. (2017). "Knowing Hands. In Knowing Hands: The Cognitive Psychology of Manual Control" (Book Description) Cambridge: Cambridge University Press. Retrieved from https://www.cambridge.org/core/books/knowing-hands/4F1226345954CA41775024100371B971#fndtn-information.

* cited by examiner

PRESENTATION OF GRAPHICAL OBJECT(S) ON DISPLAY TO AVOID OVERLAY ON ANOTHER ITEM

BACKGROUND

As recognized herein, many modern consumer electronic devices present graphical objects on their displays without regard to any other items that might also be presented on the display that a user might want to view or interact with. For example, the present application recognizes that often times application icons are presented over top of a portion of a background image showing a loved one's face or over top of another icon the user might want to select. There are currently no adequate solutions to the foregoing technological problem arising in the realm of computers.

SUMMARY

Accordingly, in one aspect a device includes at least one processor, a display accessible to the at least one processor, and storage accessible to the at least one processor. The storage includes instructions executable by the at least one processor to identify an item from an image presentable on the display. The instructions are also executable to arrange presentation on the display of one or more of the images and at least one graphical object so that the at least one graphical object is not overlaid on top of the item while the image is presented on the display concurrently with the at least one graphical object.

In another aspect, a method includes identifying an item presentable on a display and presenting at least one graphical object on the display concurrently with the item so that the at least one graphical object is not overlaid on top of the item.

In still another aspect, a computer readable storage medium that is not a transitory signal includes instructions executable by at least one processor to identify an item presentable on the display. The instructions are also executable to arrange presentation of one or more icons on the display to avoid overlay on the item while the one or more icons are concurrently presented on the display with the item.

The details of present principles, both as to their structure and operation, can best be understood in reference to the accompanying drawings, in which like reference numerals refer to like parts, and in which:

DETAILED DESCRIPTION

Figure 1:
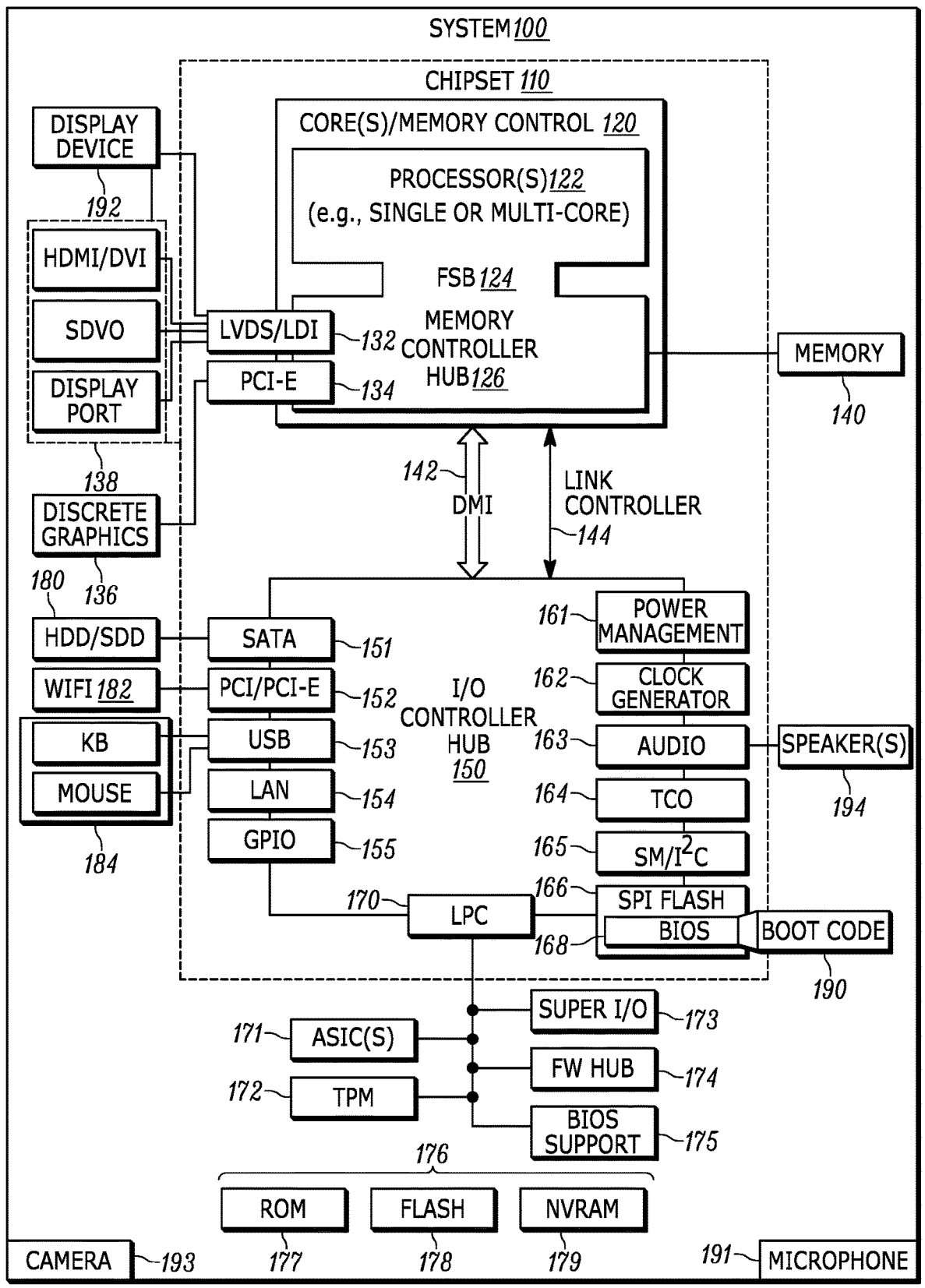
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include an audio receiver/microphone 191 that provides input from the microphone 191 to the processor 122 based on audio that is detected, such as via a user providing audible input to the microphone. The system may also include a camera 193 that gathers one or more images and provides input related thereto to the processor 122. The camera 193 may be a thermal imaging camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. The system 100 may also include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
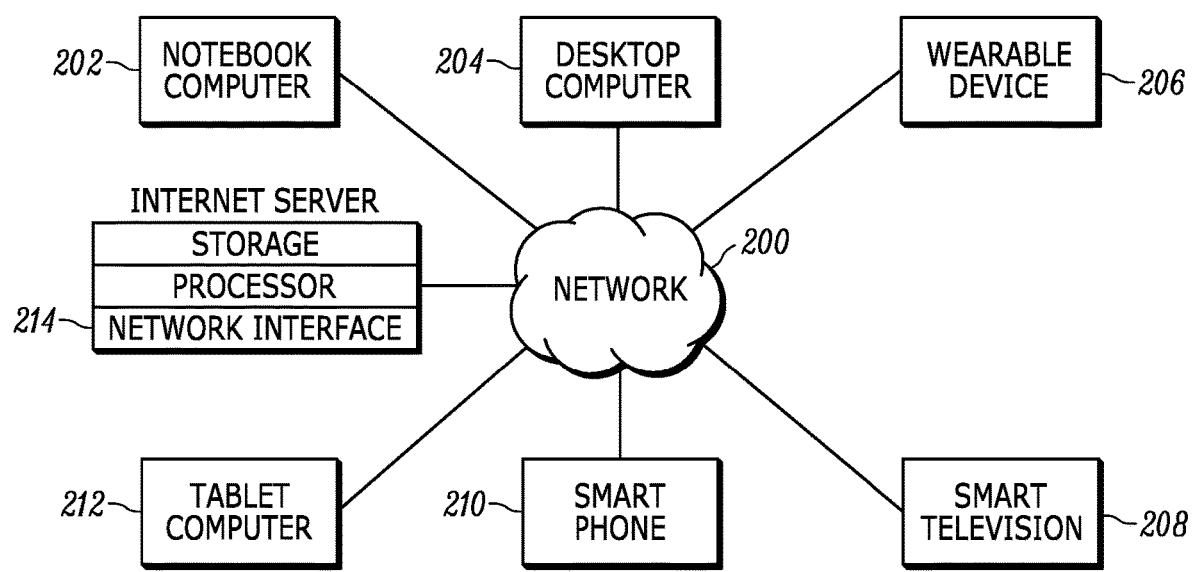
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
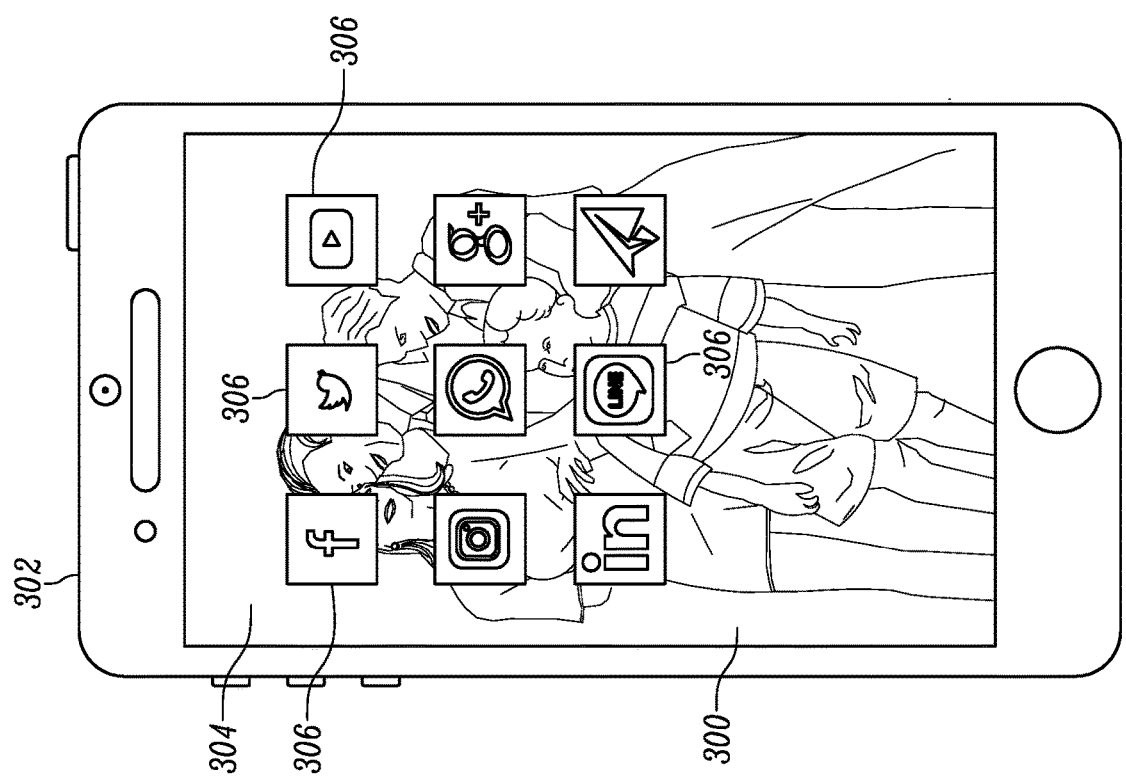

Referring now to FIG. 3, it shows an example home screen user interface (UI) 300 presented on the display of a device 302 in accordance with present principles. As may be appreciated from the UI 300, the faces of plural people shown in a background image 304 presented on the display as part of a home screen of the device 302 are at least partially obstructed from being viewed owing to application icons 306 being overlaid on portions of the background image 304 showing the faces.

Figure 4:
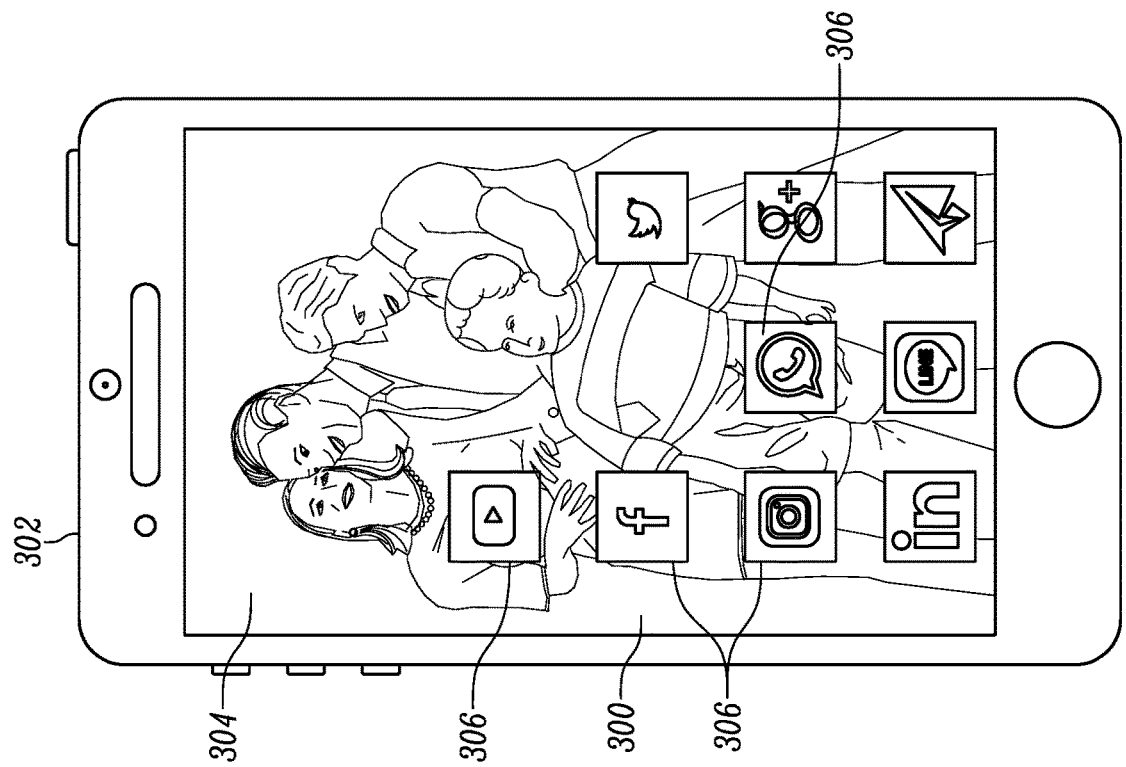
FIGS. 3-10, 12, and 13 show example graphical user interfaces demonstrating present principles.

In order to address this, the icons 306 may be rearranged on the UI 300 as shown in FIG. 4. As shown, the icons 306 have been rearranged so that the faces of each person as identified by the device 300 from the background image 304 using object recognition (e.g., facial recognition, specifically) are not obstructed from viewing.

Figure 5:
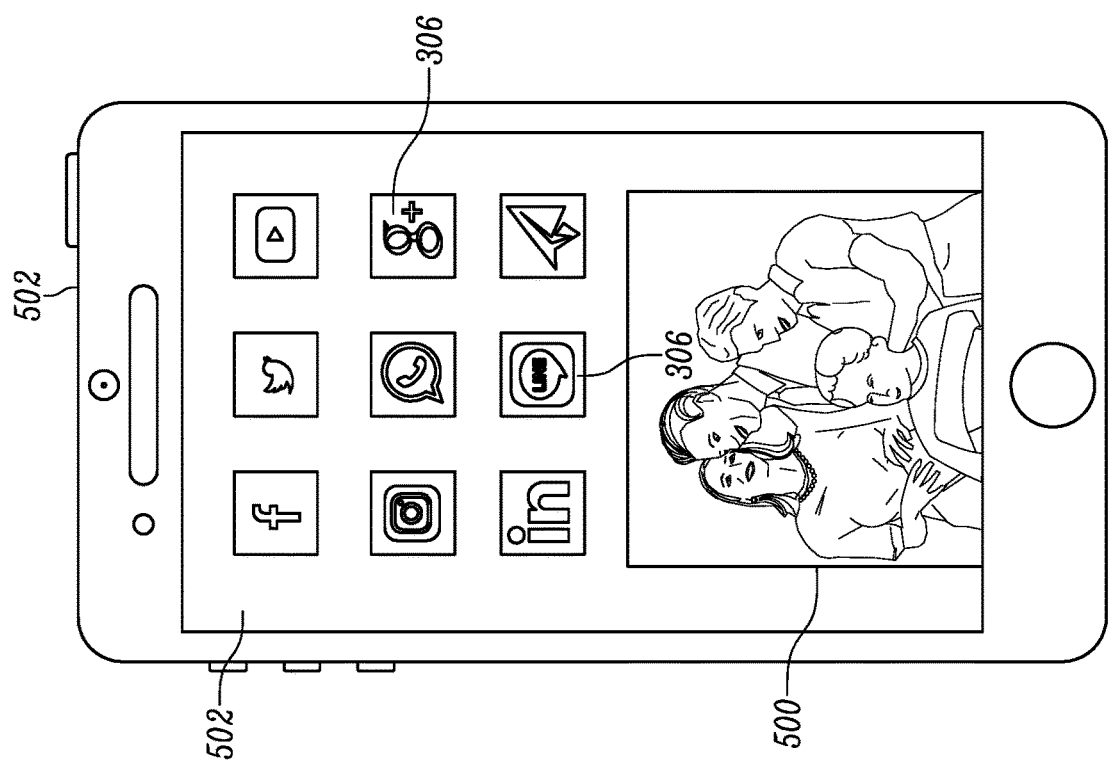

Another example is shown in FIG. 5. Again, the UI 300 is presented on the display of the device 302. However, rather than rearranging the icons 306 as illustrated in FIG. 4, here a portion 500 of the image identified as including the faces of the people in the background image 304 has been extracted from the base image and presented beneath the icons 306. As may be appreciated from FIG. 5, the portion 500 is presented at the same size as it was presented in FIG. 3 and/or as would otherwise be presented according to a default or user-defined setting for presenting background images. However, the entire background image 304 has not been presented by the device 302, only a selected box that encompasses every face identified from the image 304.

Furthermore, the portion 500 as shown in FIG. 5 has been moved downward on the display relative to its default presentation in FIG. 3. Thus, at least one other portion 502 of the UI 300 now does not present either of any icon 306 or any portion of the background image 304. But here too just as in FIG. 4, a user is able to see the faces of the people in the image 304 without any of the icons 306 overlaid on the faces. This may be the case even if the icons 306 are still arranged in a default or user-defined arrangement as shown in FIG. 5, as opposed to the icons 306 being dynamically rearranged by the device 302 as shown in FIG. 4.

Figure 6:
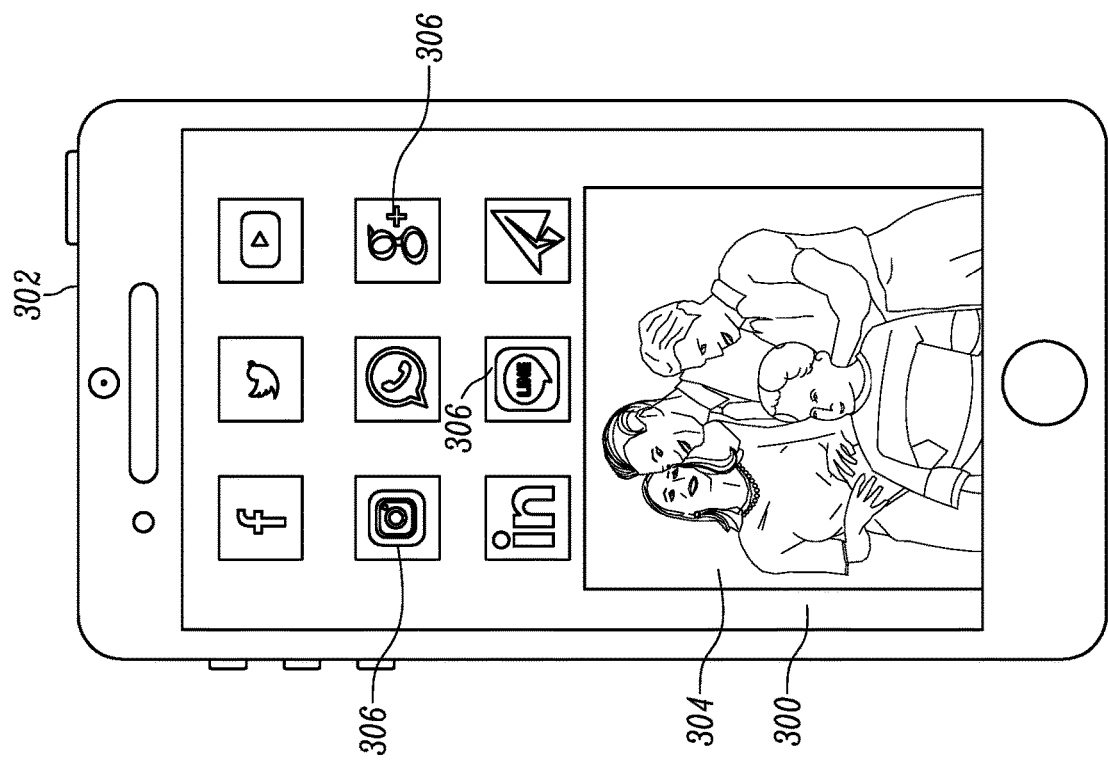

FIG. 6 shows yet another example in accordance with present principles. As shown in FIG. 6, the background image 304 has been reduced in size both horizontally and vertically so that the entire background image 304 may be presented on the display of the device 302, but with the entirety of the image 304 being presented at a display location at which none of the icons 306 are presented. The icons 306 as shown may thus still be presented according to a default or user-defined arrangement on the display while leaving the faces of the people in the image 304 unobstructed from viewing.

Figure 8:
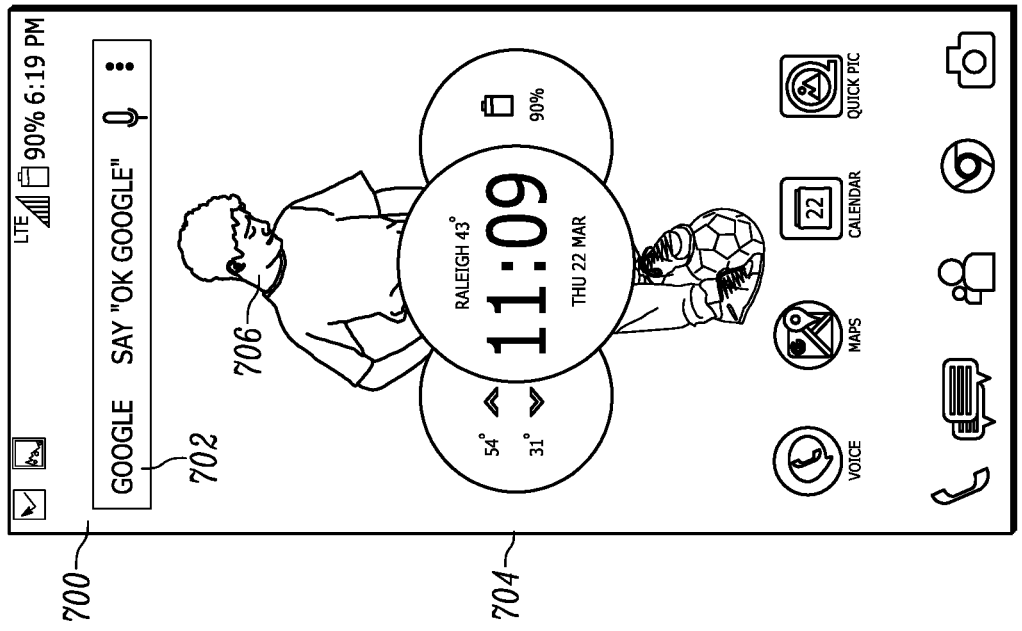
Figure 7:
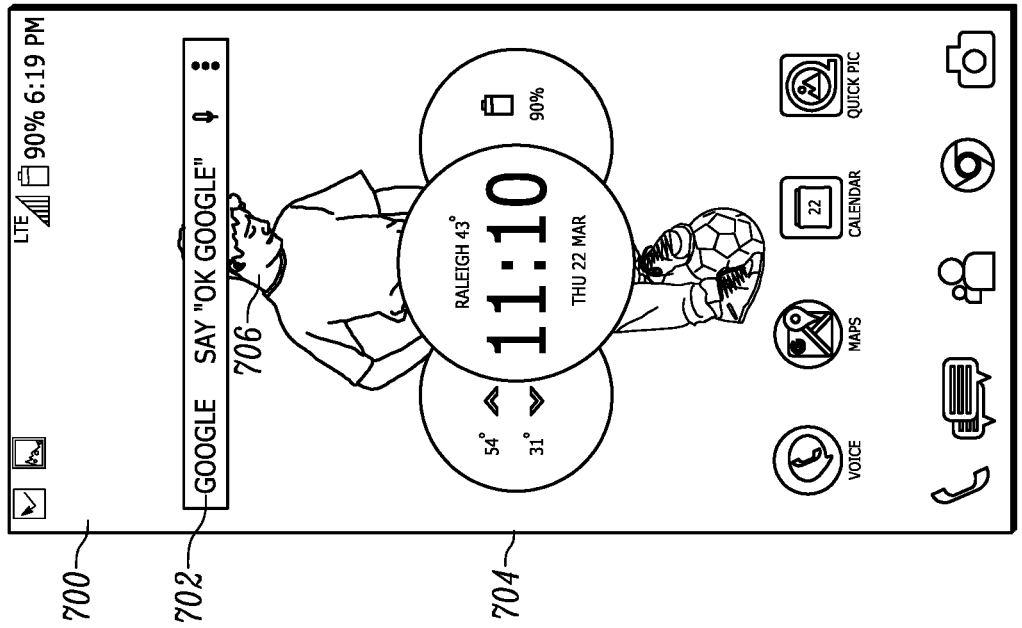

FIGS. 7 and 8 show another example in accordance with present principles. FIG. 7 again illustrates that presenting graphical objects and a background image 700 according to default or user-defined presentation settings without regard to items of interest within the background image 700 that a user might want to view is undesirable. For example, as shown in FIG. 7 an Internet search box 702 for a search application executable at the device 704 as presented at a default location is overlaid on part of the face 706 of a child shown in the background image 700.

However, with the device 704 executing facial recognition in accordance with present principles to identify the face 706, the graphical object 702 may be shifted up on the display to a new location that does not encompass any of the face 706 as shown in FIG. 8. As may be further appreciated from FIG. 8, other graphical objects may remain presented at their respective default or user-defined positions that do not overlap the face 706.

FIG. 8 also demonstrates that graphical objects as referenced herein may include not just search bars/boxes and application icons, but also other kinds graphical objects. For example, graphical objects may include windows, widgets, dialog/chat boxes, visual notifications, other types of icons, etc.

Referring back to identification of one or more items from an image presentable on a device's display as disclosed herein, note that object recognition may be used not just to identify faces of people but also to identify other items of interest to a user. For example, an animal such as a dog or cat may be identified from an image to be presented on the display concurrently with one or more graphical objects, and one or more of the images and the graphical objects may be arranged on the display so that they do not have common display coordinates and hence do not overlap each other.

As another example, an image of a landscape or other scenery may be analyzed by a device using object recognition software or other photo analysis software to identify objects in the foreground of the image and even to identify a background portion of the image. The device may then determine to present graphical objects only at portions of the image determined to compose the background of the image and to not overlay any graphical objects on any foreground objects recognized from the image. Alternatively, after identifying objects in the foreground, the device may then determine to present graphical objects only at portions of the image that have not been identified as including any objects recognizable using object recognition on the premise that those non-identifiable portions are background portions of the image.

Figure 9:
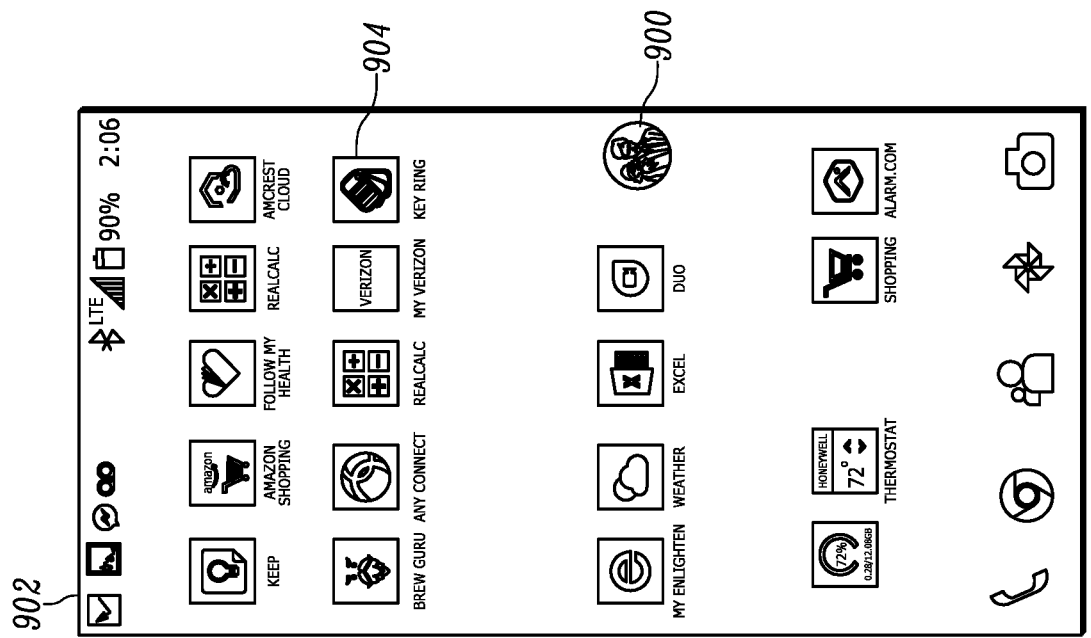
Figure 10:
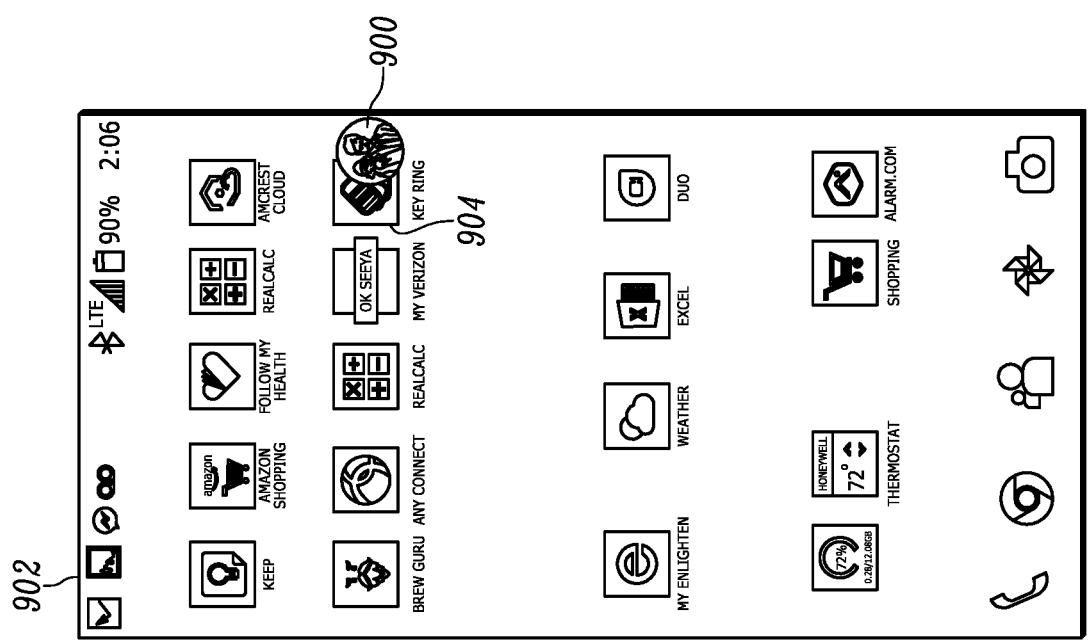

FIGS. 9 and 10 shown another example in accordance with present principles. In FIG. 9, instead of a graphical object being overlaid on a portion of a background image as with previous examples, a "pop-up" message notification icon 900 has been presented on the display of a device 902 such that it is overlaid almost completely on an application icon 904 that would otherwise be selectable to launch an associated application. However, owing to the icon 900 being partially overlaid on the icon 904, the icon 904 will either be difficult or impossible for a user to select without unintentionally selecting the icon 900, manually moving the icon 900 from its current position on the display, or removing the icon 900 from the display altogether.

Since that can be unnecessarily time consuming, annoying, and confusing for a user, FIG. 10 shows an embodiment in accordance with present principles in which the device 902 has automatically arranged the icon 900 at a location other than its default location as shown in FIG. 9. Based on this automatic arrangement at a different location as shown in FIG. 10, the icon 904 is now fully viewable and able to be selected using touch input while the icon 900 is also still selectable even though no longer overlaid on the icon 904.

Figure 11:
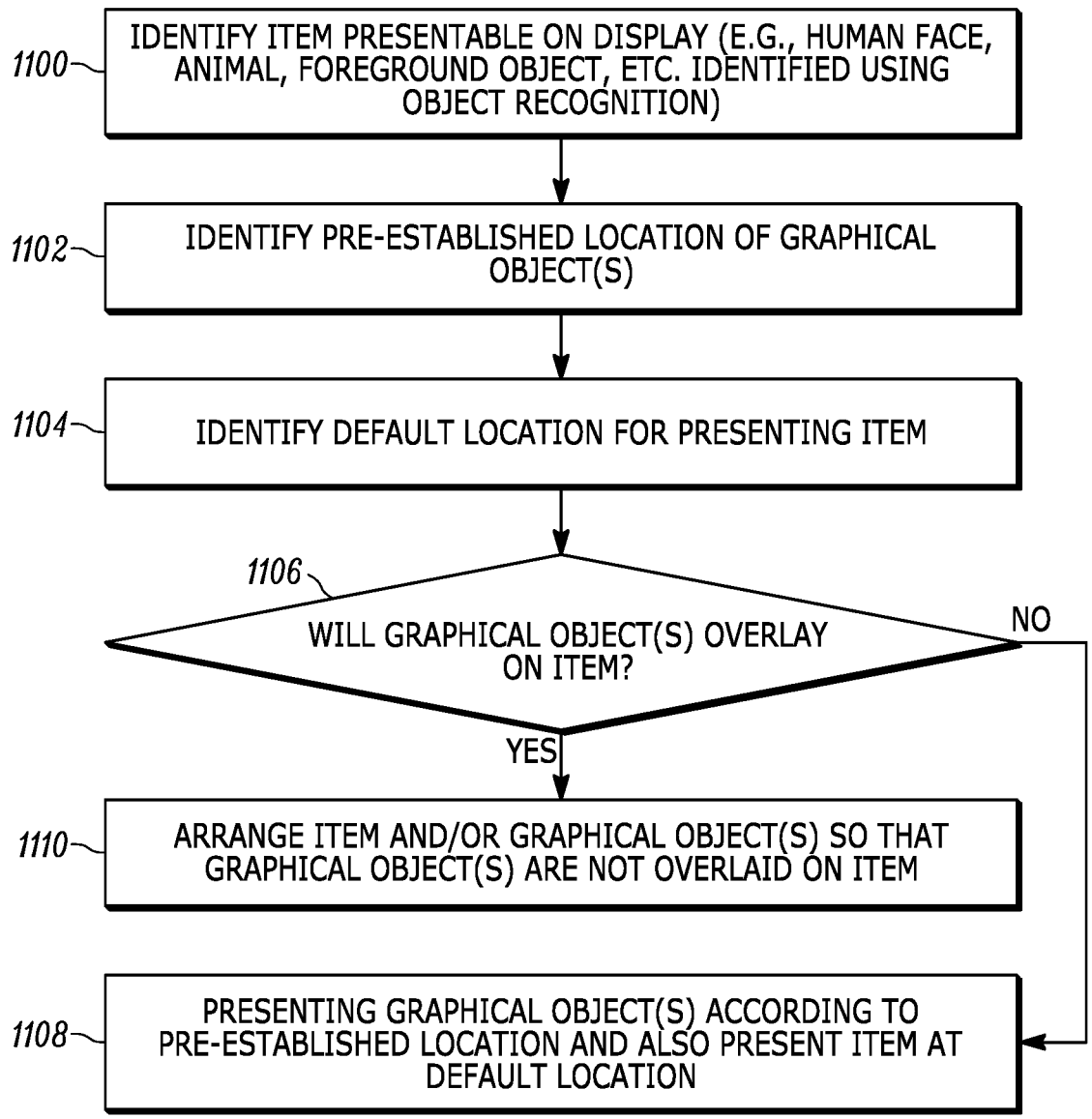
FIG. 11 is a flow chart of an example algorithm in accordance with present principles.

Continuing the detailed description in reference to FIG. 11, it shows example logic that may be executed by a device such as the system 100 in accordance with present principles. Beginning at block 1100, the device may identify an item presentable on a display that is to be left unobstructed from viewing, such as a face, animal, or foreground object shown in a home screen image, or even a graphical object such as the icon 904 described above. Object recognition, and in some cases facial recognition specifically, may be used to identify the item if the item forms part of a photograph or other type of image that is to be presented on the display. If the item is a graphical object such as the icon 904, it may be identified by accessing a storage area of the device indicating the item itself as well as location information for where the item is to be presented on the display.

Still other methods may be used to identify an item presentable on the display that is to be unobstructed from viewing. For example, if an image that is to be presented as part of a home screen or other background image of the device has been previously presented at the device, during that previous presentation the device may have executed eye tracking using images of the user's face gathered by the device to identify an area of the image gazed at (and/or pointed at using a finger) by the user for more than a threshold non-zero amount of time. Based on a certain area being gazed at for the threshold amount of time, the device may determine that the area includes content of interest to the user and hence may store data indicating that this particular area of the image is to be left unobstructed.

As another example, if an image that is to be presented as part of a home screen or other background image of the device has been previously presented at the device, during that previous presentation the device may have executed voice recognition using input from a microphone on the device to identify an area of the image or object in the image being spoken about by the user. For example, the user may say something like "look at that in the top left corner" and the device may accordingly determine that a top left quadrant of the image should be left unobstructed when presented again along with graphical objects and may store data indicating that the top left quadrant is to be left unobstructed in the future. As yet another example, if multiple objects are shown in a certain image and are recognized using object recognition, but a user only speaks about one of the objects the first time it is presented at the device, the device may accordingly determine that the object being spoken about should be left unobstructed when presented again along with graphical objects and may store data indicating that the spoken-about object is to be left unobstructed in the future.

From block 1100, the logic of FIG. 11 may then proceed to block 1102. At block 1102 the device may identify one or more pre-established locations of graphical objects that are already presented or that are to be presented on the display. For example, the pre-established locations may be default display locations arranged in alphabetical order of the objects' respective names, or default display locations arranged in order of when the respective applications associated with the graphical objects were downloaded and stored at the device. The pre-established locations may also be respective display locations specified by the user for respective graphical objects.

From block 1102 the logic may then move to block 1104. At block 1104 the device may identify a default display location for presenting an item on the display. For example, if the item forms part of a photograph, the default location may be a location of the item when the photograph is presented full-screen as a home screen background for the device. As another example, if the item were another graphical object, the location at which it is to be presented by default or based on previous user input may also be identified.

Thereafter the logic may move to decision diamond 1106. At diamond 1106 the device may determine whether the identified graphical objects will be overlaid on or otherwise obstruct a view of the identified item. This may be determined by comparing Y display coordinates for the identified graphical objects with X, Y display coordinates for the item to determine if any of the coordinates overlap.

If a negative determination is made at diamond 1106, the logic may move to block 1108 where the device may present both the identified item and the identified graphical objects according to their pre-established/default locations. However, if an affirmative determination is made at diamond 1106, the logic may instead proceed to block 1110 where the device may arrange the identified item and/or the identified graphical objects as disclosed herein so that the graphical objects are not overlaid on the item.

Figure 12:
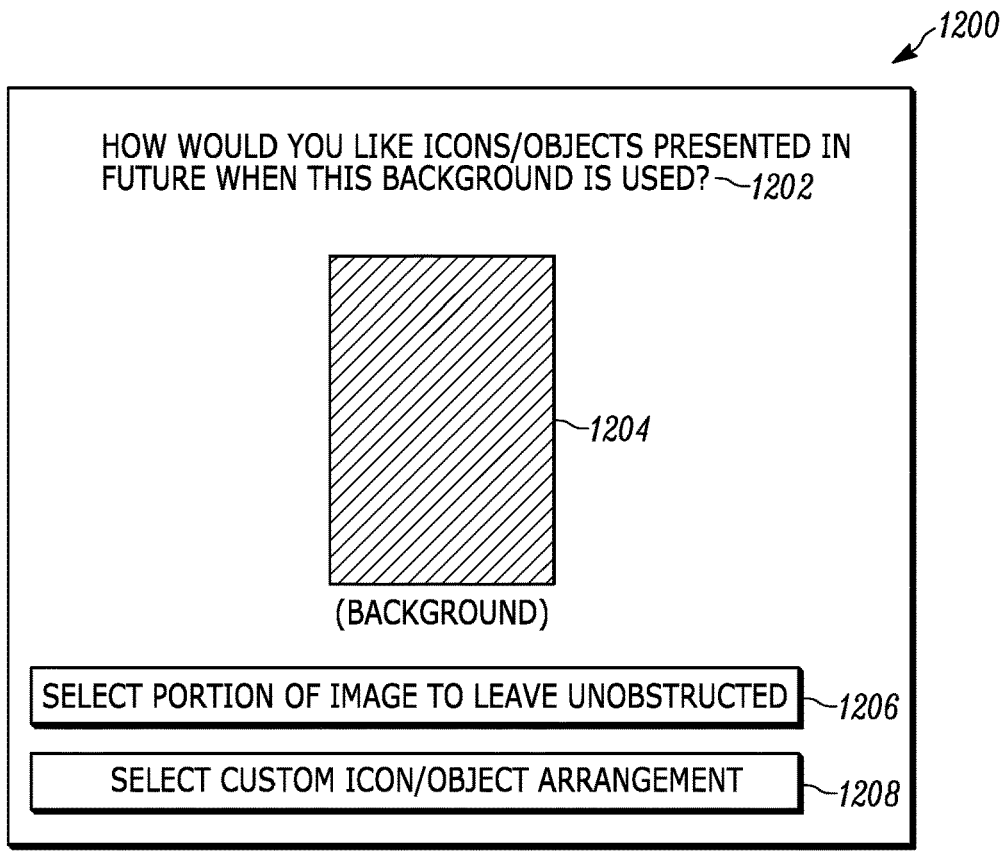

Now in reference to FIG. 12, it shows an example user interface (UI) 1200 presentable on the display of a device undertaking present principles. The UI 1200 may be presented on the display to prompt a user for how the user would like graphical objects arranged for a particular background/home screen image, such as one that might have just been selected by the user when configuring the home screen. The UI 1200 may therefore include a text prompt 1202 asking the user how the user would like icons and other graphical objects presented in the future when the selected background/home screen image is presented. The UI 1200 may even include a thumbnail 1204 of the background/home screen image.

Selectors 1206 and 1208 may also be presented on the UI 1200. The selector 1206 may be selected to provide a command for the device to move an item of interest in the image to an area of the display where it can be viewed unobstructed while graphical objects are still presented at their pre-established locations. For example, selection of the selector 1206 may cause the device to operate according to the embodiments described above in reference to FIGS. 5 and 6.

The selector 1208 may be selected to provide a command for the device to dynamically arrange graphical objects on the display so that an item of interest in the image may remain unobstructed while the image itself is still presented at its default location. For example, selection of the selector 1208 may cause the device to operate according to the embodiments described above in reference to FIGS. 4, 8, and 10.

Figure 13:
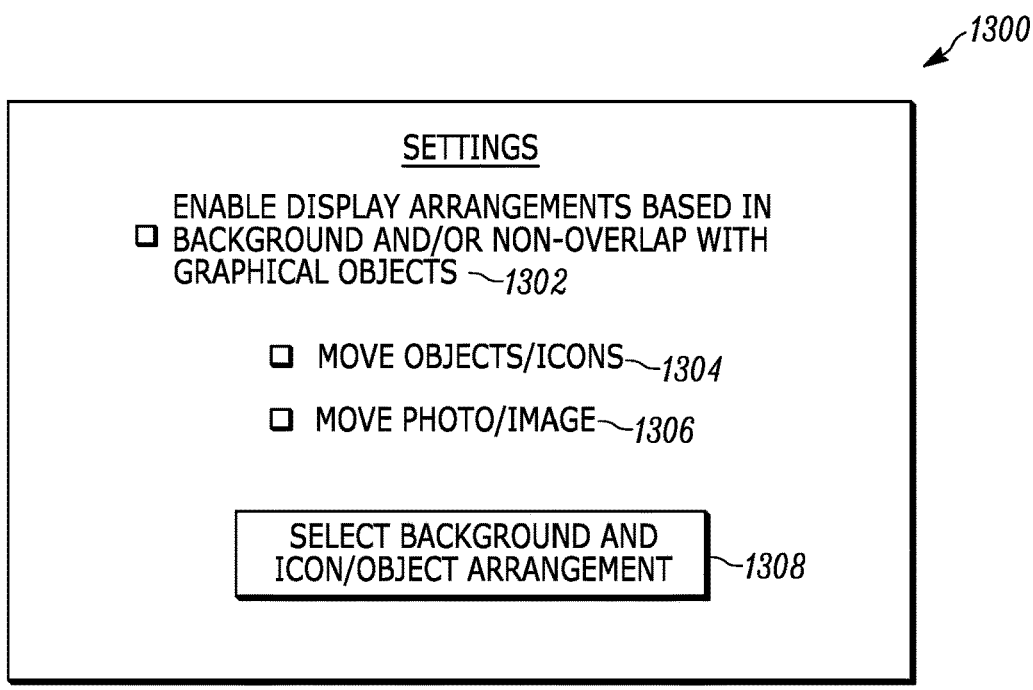

FIG. 13 shows another user interface (UI) 1300 that may be presented on the display of a device undertaking present principles. The UI 1300 may be presented for configuring one or more settings of the device. Thus, the UI 1300 may include a first option 1302 that is selectable to enable the device to undertake present principles. For example, the option 1302 may be selected by directing touch or cursor input to the adjacent check box to enable or configure the device to undertake the logic described above in reference to FIG. 11 and/or to undertake the functions disclosed above in reference to FIGS. 4-6, 8, and 10.

The option 1302 may also have various sub-options listed underneath it, such as sub-option 1304 that is selectable to enable the device to move graphical objects from default locations so that certain items from images may remain unobstructed from view. A sub-option 1306 may also be presented that is selectable to enable the device to, instead of moving the graphical objects from default locations, adjust presentation of the images themselves by shifting relevant portions of the images to unobstructed display locations or by shrinking the image so that relevant portions can be viewed unobstructed.

Still further, the UI 1300 may include a selector 1308 that is selectable to initiate a process for selecting items to leave unobstructed by graphical objects when presented concurrently on the device's display. For example, selection of the selector 1308 may cause the UI 1200 to be presented.

Additionally, or alternatively, selection of the selector 1308 may cause a background/home screen selection screen to be presented at which the user may select or navigate to a particular image to set as a background/home screen image for the device. After selecting the particular image, the UI 1200 may be presented or alternatively the user may direct touch input to items shown within the image to select those items as portions of the image to be left unobstructed when presented concurrently with icons and other graphical objects. The touched objects may be identified by executing object recognition software, and/or by executing image processing software to identify the boundaries of the selected item even if the selected item itself cannot be identified using object recognition. Items from the image that are touched may then be left unobstructed when the image is again presented in the future concurrently with icons or other graphical objects. This may be particularly useful in "rotating" background image embodiments where the home screen background image rotates from one image to another after a preset amount of time.

It may now be appreciated that present principles provide systems and methods for an electronic device to sort icons and other graphical objects so that they do not obstruct other graphical objects and even certain attention centers of images that are concurrently presented on the same display with the graphical objects. Sorting may be triggered responsive to a new icon being added to a user's home screen or other screen, responsive to an icon re-appearing on one of those screens, or responsive to a background image or other image being modified. For example, if items that the device is to leave unobstructed include video game controls or other buttons for playing a computer game, a pop-up social networking chat icon that might otherwise be overlaid on one or more of the video game controls may instead be presented elsewhere on the display where the pop-up icon will not interfere with a user's viewing of the video game controls and ability to provide input using them. What's more, in some embodiments in addition to or in lieu of sorting the icons themselves, a background image with an item that is to be unobstructed may be slid horizontally or vertically, and/or have portions including the item enlarged or shrunk, so that the item may remain unobstructed. These concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a display accessible to the at least one processor; and
   storage accessible to the at least one processor and comprising instructions executable by the at least one processor to:
   identify an item from an image presentable on the display that is to not have graphical objects overlaid on the item while the image is presented on the display;
   arrange, based on the identification, presentation on the display of one or more of the image and at least one graphical object so that the at least one graphical object is not overlaid on top of the item while the image is presented on the display concurrently with the at least one graphical object, the image being different from the at least one graphical object; and subsequent to the arrangement and responsive to a new graphical object being added to a screen of the device, rearrange presentation on the display of one or more of the image and one or more graphical object so that graphical objects are not overlaid on top of the item while the image is presented on the display;

wherein the new graphical object comprises a search box.

2. The device of claim 1, wherein the at least one graphical object comprises an object selected from the group consisting of: an icon, a window, a widget, a dialog, a notification.

3. The device of claim 1, wherein the instructions are executable by the at least one processor to:

arrange presentation of the image on the display so that the at least one graphical object is not overlaid on top of the item while the image is presented on the display concurrently with the at least one graphical object, presentation of the image being arranged at least in part by presenting the image on part but not all of the display such that at least one area of the display does not present either of the at least one graphical object and the image.

4. The device of claim 1, wherein the instructions are executable by the at least one processor to:

arrange presentation of the at least one graphical object on the display so that the at least one graphical object is not overlaid on top of the item.

5. The device of claim 1, wherein the screen is a home screen of the device, and wherein the image is a background image of the home screen of the device.

6. The device of claim 1, wherein the instructions are executable to:

identify the item using at least one microphone, wherein voice recognition is executed using input from the at least one microphone to identify the item as being spoken about by a user.

7. The device of claim 1, wherein the screen is a home screen of the device.

8. The device of claim 1, wherein the at least one graphical object subject to the rearrangement comprises the new graphical object.

9. The device of claim 1, wherein the instructions are executable to:

identify the item using at least one camera, wherein the item is identified using at least one image from the at least one camera based on the at least one image indicating a user as pointing at the item with a finger.

10. The device of claim 1, wherein the instructions are executable to:

rearrange presentation on the display of one or more graphical objects responsive to a rotating background image being presented on the display.

11. The device of claim 1, wherein the instructions are executable to:

based on presentation of plural video game controls for playing a computer game, rearrange presentation on the display of one or more graphical objects.

12. The device of claim 11, wherein the plural video game controls comprise at least one button for playing the computer game.

13. A method, comprising:

identifying respective items from respective rotating background images presentable on a display that are to be left unobstructed from viewing while presented on the display, the rotating background images used for rotating from one background image to another background image after a preset amount of time; and presenting, based on the identifying, at least one graphical object on the display concurrently with a respective rotating background image so that the at least one graphical object is not overlaid on top of a respective item from the respective rotating background image, wherein the at least one graphical object is different from the respective item from the respective rotating background image.

14. The method of claim 13, wherein the at least one graphical object comprises an application icon.

15. The method of claim 13, wherein the respective items are identified using at least one camera, and wherein the respective items are identified based on at least one image from the at least one camera indicating a user as pointing at the respective items using a finger.

16. The method of claim 13, wherein the at least one graphical object comprises a search box.

17. A computer readable storage medium (CRSM) that is not a transitory signal or a propagating electrical signal or an electromagnetic signal per se or a carrier wave, the computer readable storage medium comprising instructions executable by at least one processor to:

identify, based on input from at least one sensor, one or more video game controls that are to be left unobstructed from viewing by one or more icons while the one or more video game controls are presented on a display; and arrange presentation of one or more icons on the display to avoid obstructing the one or more video game controls from view while the one or more video game controls are presented on the display;

wherein the one or more video game controls comprise plural video game controls for playing a computer game, the plural video game controls for playing the computer game being presented concurrently on the display and left unobstructed by the one or more icons also concurrently presented on the display with the plural video game controls.

18. The CRSM of claim 17, wherein the plural video game controls comprise at least one button for playing the computer game.

19. The CRSM of claim 17, wherein the one or more icons that do not obstruct the plural video game controls comprise at least one pop-up icon.

20. The CRSM of claim 17, wherein the one or more icons comprise at least one pop-up icon.

* * * * *